United States Patent [19]

McCready

[11] 4,452,933

[45] Jun. 5, 1984

[54] STABILIZED POLYESTER-POLYCARBONATE BLENDS AND STABILIZATION PROCESS THEREFOR

[75] Inventor: Russell J. McCready, Mt. Vernon, Ind.

[73] Assignee: General Electric Company, Schenectady, N.Y.

[21] Appl. No.: 502,826

[22] Filed: Jun. 9, 1983

[51] Int. Cl.$^3$ .................. C08K 5/20; C08K 5/11; C08K 5/10; C08K 5/09

[52] U.S. Cl. ...................... 524/217; 524/221; 524/222; 524/223; 524/238; 524/240; 524/291; 524/310

[58] Field of Search ............... 524/217, 221, 222, 223, 524/238, 240, 291, 310

[56] References Cited

U.S. PATENT DOCUMENTS

| | | | |
|---|---|---|---|
| 2,214,405 | 9/1940 | Coffman | 524/221 |
| 3,218,372 | 11/1965 | Okamura et al. | 525/439 |
| 3,386,935 | 6/1968 | Jackson et al. | 524/291 |
| 3,491,057 | 1/1970 | Kato et al. | 524/240 |
| 3,594,448 | 7/1971 | Birenzvige et al. | 524/291 |
| 3,943,100 | 3/1976 | Berenbaum et al. | 524/291 |
| 3,998,796 | 12/1976 | Steinhardt | 260/79.7 |
| 4,044,073 | 8/1977 | Baron et al. | 525/439 |
| 4,147,738 | 4/1979 | Borman | 525/439 |

FOREIGN PATENT DOCUMENTS

1022958 3/1966 United Kingdom.

OTHER PUBLICATIONS

E. A. Joseph et al., "Boiling Water Aging of a Miscible Blend of Polycarbonate and a Polyester", J. Applied Polymer Science, vol. 27, 4807–4819 (1982).

D. C. Wahrmund et al., "Polyester-Polycarbonate Blends, I. Poly(butylene Terephthalate)", J. Applied Polymer Science, vol. 22, 2215–2164 (1978).

T. R. Nassar et al., "Polyester-Polycarbonate Blends, II, Poly(ethylene Terephthalate)", J. Applied Polymer Science, vol. 23, 85–99 (1979).

*Primary Examiner*—Veronica P. Hoke
*Attorney, Agent, or Firm*—William H. Pittman; James C. Davis, Jr.; James Magee, Jr.

[57] ABSTRACT

Ester-carbonate interchange in blends of aromatic polycarbonates and poly(alkylene dicarboxylates) is inhibited by adding thereto a hydroxy- or amino-substituted carboxylic acid derivative such as methyl salicylate, malic acid, glycine or dibutyl tartrate.

22 Claims, No Drawings

STABILIZED POLYESTER-POLYCARBONATE BLENDS AND STABILIZATION PROCESS THEREFOR

This invention relates to a process for the stabilization of polymer blends and to polymer blends thus stabilized. In its broadest sense, the invention is directed to a process for stabilizing a composition comprising at least one poly(alkylene dicarboxylate) and at least one aromatic polycarbonate which comprises adding thereto an amount effective to inhibit ester-carbonate interchange of at least one substituted carboxylic acid derivative of the formula

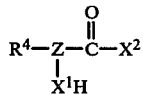

wherein:
$X^1$ is O or NH;
$X^2$ $OR^5$ when $X^1$ is NH and is $OR^5$ or $NHR^5$ when $X^1$ is O;
Z is CH or a single-ring aromatic carbocylic radical in which the $X^1H$ and

moieties occupy ortho positions;
$R^4$ is hydrogen or a lower hydrocarbon-based radical; and
$R^5$ is hydrogen, lower alkyl or lower aryl.

Blends of poly(alkylene dicarboxylates) (hereinafter "polyesters") and poly(arylene carbonates) (also known as aromatic polycarbonates and referred to hereinafter as "polycarbonates") are widely used in industry. A disadvantage of these blends, however, that inhibits their use to some degree is their tendency to undergo ester-carbonate interchange. In this interchange, ester linkages in both the polycarbonate and the polyester are broken and may be replaced by alkylene carbonate and aryl carboxylate bonds. The result is degradation of the physical properties of the polymer due to hybridization of the molecular linkages therein.

A principal object of the present invention, therefore, is to provide improved polyester-polycarbonate blends.

A further object is to provide polyester-polycarbonate blends with a decreased tendency to undergo ester-carbonate interchange.

A further object is to provide a process for stabilizing polyester-polycarbonate blends against such interchange.

Other objects will in part be obvious and will in part appear hereinafter.

The polyesters present in the blends which are stabilized by the process of this invention are poly(alkylene dicarboxylates), which normally comprise repeating units of the formula

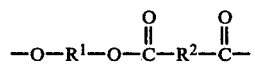

wherein $R^1$ is a saturated divalent aliphatic or alicyclic hydrocarbon radical containing about 2-10 and usually about 2-6 carbon atoms and $R^2$ is a divalent aliphatic radical containing about 2-20 carbon atoms or a divalent aromatic radical containing about 6-20 carbon atoms.

Illustrative $R^1$ radicals are ethylene, propylene, trimethylene, tetramethylene, pentamethylene, hexamethylene and 1-4-cyclohexylene. The straight-chain radicals are preferred, especially ethylene, trimethylene and tetramethylene, but branched radicals are also contemplated.

The polyesters are typically prepared by the reaction of at least one alkanediol of the formula HO—$R^1$—OH with at least one dicarboxylic acid of the formula HOOC—$R^2$—COOH or dialkyl ester thereof. The dicarboxylic acid may be an aliphatic acid such as succinic, glutaric, adipic, sebacic, azelaic or suberic acid, or an aromatic acid such as isophthalic or terephthalic acid. The aromatic acids, especially terephthalic acid, are preferred. The use of an ester and especially a lower alkyl ester is preferred, the term "lower alkyl" denoting alkyl groups having up to 7 carbon atoms; it is most often a methyl, ethyl or butyl ester. The reaction is ordinarily catalyzed by a titanium compound, frequently a tetraalkyl titanate. Suitable titanates include, for example, tetraisopropyl titanate and tetra(2-ethylhexyl)titanate.

Further suitable reagents for forming polyesters, and titanium compounds useful as catalysts therefor, are described in the following U.S. Pat. Nos.:
2,465,319
2,720,502
2,727,881
2,822,348
3,047,539

The disclosures of these patents are incorporated by reference herein.

For the preparation of the polyester, the dicarboxylic acid or ester thereof, alkanediol and titanium-containing catalyst are typically heated in the range of about 180°–300° C. for a period of time sufficient to produce the desired polyester. The mole ratio of diol to acid or ester is typically from about 1:1 to about 1.4:1 and preferably from about 1.2:1 to about 1.3:1, the excess diol being useful to drive the reaction to completion. The amount of titanium-containing catalyst used is typically about 0.005–0.2 percent by weight, based on the amount of acid or ester.

The polyesters used according to this invention normally have number average molecular weights in the range of about 20,000–50,000.

The expression "polycarbonate" as used herein is meant to embrace within its scope carbonate homopolymers of dihydroxyaromatic compounds and carbonate copolymers of such dihydroxyaromatic compounds with glycols, such as ethylene glycol or propylene glycol, or with hydroxy-terminated polyesters of such glycols and dibasic acids such as isophthalic, terephthalic or adipic acid. Such polycarbonates may be prepared by reacting the dihydroxyaromatic compound with a carbonate precursor such as phosgene, a haloformate or a carbonate ester. Generally speaking, the polycarbonates comprise repeating units of the formula

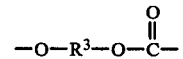

wherein $R^3$ is a divalent aromatic radical derived from a dihydroxyaromatic compound of the formula HO—R³—OH. Typical dihydroxyaromatic compounds are 2,2-bis-(4-hydroxyphenyl)propane (bis-phenol A), hydroquinone, resorcinol, 2,2-bis-(4-hydroxyphenyl)-pentane, 2,4'-dihydroxydiphenylmethane, bis-(2-hydroxyphenyl)methane, bis-(2-hydroxy-3-chlorophenyl)propane, bis-(4-hydroxyphenyl)methane, bis-(4-hydroxy-5-nitrophenyl)methane, 1,1-bis-(4-hydroxyphenyl)ethane, 1,1-bis-(3-bromo-4-hydroxyphenyl)ethane, 3,3-bis-(4-hydroxyphenyl)-pentane, 2,2'-dihydroxydiphenyl, 2,6-dihydroxynaphthalene, bis-(4-hydroxyphenyl)sulfone, bis-(4-hydroxy-5-chlorophenyl)sulfone, 2,4'-dihydroxydiphenyl sulfone, 4,4'-dihydroxydiphenyl ether, 4,4'-dihydroxy-2,5-diethoxydiphenylether, and 1,1-dichlor-2,2-(4-hydroxyphenyl)ethylene. Other suitable dihydroxyaromatic compounds are disclosed in a number of patents including commonly assigned U.S. Pat. No. 2,999,835, the disclosure of which is incorporated by reference herein. It is, of course, possible to employ two or more different dihydric phenols or, as stated above, a dihydric phenol in combination with a glycol or a hydroxy-terminated polyester in the event a copolymer rather than a homopolymer is desired.

When a carbonate ester is used as the carbonate precursor in the polycarbonate-forming reaction, the materials are reacted at temperatures of from 100° C. or higher for times varying from 1 to 15 hours. Under such conditions, ester interchange occurs between the carbonate ester and the dihydroxyaromatic compound. The ester interchange is advantageously effected at reduced pressures of the order of from about 0.10 to 100 torr, preferably in an inert atmosphere such as nitrogen or argon.

Although the polycarbonate-forming reaction may be effected in the absence of a catalyst, one may, if desired, employ the usual ester exchange catalysts, such as, for example, metallic lithium, potassium, calcium and magnesium. Additional catalysts and variations in the exchange methods are discussed in Groggins, *Unit Processes in Organic Syntheses*, Fourth Edition, pp. 616–620. The amount of such catalyst, if used, is usually small, ranging from about 0.001 to about 0.1 mole percent based on the dihydroxyaromatic compound. The carbonate ester useful in this connection may be aliphatic or aromatic, although aromatic esters, such as diphenyl carbonate, are preferred. Additional examples of carbonate esters which may be used are dimethyl carbonate, diethyl carbonate, phenyl methyl carbonate, phenyl tolyl carbonate and ditolyl carbonate.

A preferred method for preparing the polycarbonate involves the use of a carbonyl halide, such as phosgene. This method involves passing phosgene gas into a reaction mixture containing the dihydroxyaromatic compound and an acid acceptor such as a tertiary amine, e.g., pyridine, dimethylaniline or quinoline. The acid acceptor may be used undiluted or diluted with inert organic solvents, as for example, methylene chloride, chlorobenzene or 1,2-dichloroethane. Tertiary amines are advantageous since they are good solvents as well as acid acceptors.

The temperature at which the carbonyl halide reaction proceeds may vary from below 0° C. to about 100° C., preferably from room temperature (about 25° C.) to 50° C. Since the reaction is exothermic, the rate of phosgene addition may be used to control the reaction temperature. The amount of phosgene required will generally depend upon the amount of dihydric phenol present. Generally speaking, one mole of phosgene will react with one mole of the dihydroxyaromatic compound to yield the polycarbonate and two moles of hydrogen chloride, which is neutralized by the acid acceptor. The foregoing are herein referred to as stoichiometric or theoretical amounts.

Another method of preparing the polycarbonate comprises adding phosgene to an alkaline aqueous suspension of the dihydroxyaromatic compound. This is preferably done in the presence of inert solvents such as methylene chloride, 1,2-dichloroethane or the like. Quaternary ammonium compounds may be employed to catalyze the reaction.

Still another method for preparing the polycarbonate involves the phosgenation of an agitated suspension of the anhydrous alkali metal salt of the dihydroxyaromatic compound in a non-aqueous medium such as benzene, chlorobenzene or toluene. The reaction is illustrated by the addition of phosgene to a slurry of the sodium salt of 2,2-bis-(4-hydroxyphenyl)propane in chlorobenzene. The organic solvent should be preferably a polymer solvent but need not necessarily be a good solvent for the reactants.

Generally speaking, a haloformate, such as the bishaloformate of 2,2-bis-(4-hydroxyphenyl)propane, may be substituted for phosgene as the carbonate precursor in any of the methods described above.

In each of the above solution methods of preparation, the polycarbonate is removed in either a true or pseudo solution. It may be precipitated from the solution by adding a polymer nonsolvent, such as heptane or isopropanol. Alternatively, the polymer solution may be heated to evaporate the solvent. The polycarbonates typically have intrinsic viscosities of about 0.35–1.30 dl./g. as measured in dioxane at 30° C.

According to the present invention, there is added to the polyester-polycarbonate blend an amount effective to inhibit ester-carbonate interchange of at least one substituted carboxylic acid derivative having the above formula. The $X^1$ value therein may be either O (preferably) or NH. The $X^2$ value may be either $OR^5$ or $NHR^5$ and is always the former when $X^1$ is NH.

The $R^5$ value may be either hydrogen, lower alkyl or lower aryl, the term "lower" denoting radicals having up to 7 carbon atoms. The preferred $R^5$ values are hydrogen or methyl.

The Z value may be CH or a single-ring aromatic carbocyclic radical; i.e., a benzene ring on which the $R^4$, $X^1H$ and

moieties are substituents. The last two of these moieties occupy ortho positions on the ring. The ring may also contain other substituents, provided they do not materially affect the character of the substituted carboxylic acid derivative for the purposes of this invention. However, it is usually unsubstituted other than by the previously enumerated moieties.

The $R^4$ value is either hydrogen or a lower hydrocarbon-based radical. The term "hydrocarbon-based radical" denotes both hydrocarbon and substituted hydrocarbon radicals, provided the substituents satisfy the above criterion. Most often, $R^4$ is either hydrogen or a lower alkyl or (especially) lower aryl radical which may contain substituents such as hydroxy, carboxy and carbalkoxy (the carbalkoxy radical usually being COOR$^5$).

It will be apparent from the foregoing that the substituted carboxylic acid derivatives used according to this invention may be α-hydroxy or α-amino aliphatic acid derivatives or o-hydroxy or o-amino aromatic acid derivatives. Illustrative compounds of this type are methyl salicylate, ethyl salicylate, phenyl salicylate, salicylamide, glycine, malic acid, mandelic acid and dibutyl tartrate.

The weight ratio of polyester to polycarbonate may vary widely. It may, for example, be from about 99:1 to about 1:99, and is typically from about 10:90 to about 90:10 and preferably from about 25:75 to about 75:25. The substituted carboxylic acid derivative typically comprises about 0.02–10% and preferably about 0.05–5% by weight, based on the polyester-polycarbonate combination. The compositions may also contain conventional additives such as stabilizers and impact modifiers in conventional amounts.

The mechanism by which the substituted carboxylic acid derivatives act as inhibitors of ester-carbonate interchange is believed to involve a reaction with tetraalkyl titanates, which are present in the polyester in trace amounts as a result of their use as transesterification catalysts in the preparation thereof, to displace one or two alkoxy groups therefrom and form chelates involving the carbonyl moiety. The formation of similar chelates is described by Yamamoto et al. at *J. Inorg. and Nuclear Chem.*, 21, 58 (1961). Said chelates apparently have a lower tendency than the tetraalkyl titanates to catalyze ester-carbonate interchange. However, the invention is not to be considered as dependent on this or any theory of operation.

An illustrative stabilized composition according to this invention comprises 55.6 parts by weight of a bisphenol A polycarbonate having an intrinsic viscosity of 0.641 dl./g. in dioxane at 30° C., 44.4 parts by weight of a poly(tetramethylene terephthalate) having a number average molecular weight of about 34,000 and an intrinsic viscosity of 1.05 dl./g. in a 3:2 mixture of phenol and tetrachloroethane at 30° C., 0.5% by weight of methyl salicylate based on the polycarbonate-polyester blend, and 13.6% by weight, based on the polycarbonate-polyester blend, of conventional stabilizers and impact modifiers. The blend is prepared by conventional extrusion techniques and may be subjected to conventional molding operations.

The effectiveness of the substituted carboxylic acid derivatives as inhibitors of ester-carbonate interchange is illustrated by a series of model reactions between equimolar amounts of butylene dibenzoate and diphenyl carbonate in the presence of 0.1% by weight, based on said reagents, of tetraisopropyl titanate in methylene chloride solution. In the absence of substituted carboxylic acid derivative, about 20% of the dibutyl terephthalate and diphenyl carbonate reacted within 10 minutes at 250° C., to form various mixed butylene and phenyl benzoates and carbonates. The addition of 0.1 mole percent (0.06% by weight) of methyl salicylate, however, completely suppressed this reaction. The reaction was also suppressed by the addition of 0.1 mole percent of malic acid, glycine, dibutyl tartrate, mandelic acid or salicylic acid.

What is claimed is:

1. A process for stabilizing a composition comprising at least one poly(alkylene dicarboxylate) prepared by the reaction of at least one alkenediol with at least one dicarboxylic acid or dialkyl ester thereof in the presence of a titanium compound as catalyst and at least one aromatic polycarbonate,
which comprises adding thereto an amount effective to inhibit ester-carbonate interchange of at least one α-hydroxy or α-amino aliphatic acid derivative, or o-hydroxy or σ-amino aromatic acid derivative, of the formula

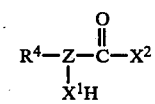

wherein:
X$^1$ is O or NH;
X$^2$ or OR$^5$ when X$^1$ is NH and is OR$^5$ or NHR$^5$ when X$^1$ is O;
Z is CH or a single-ring aromatic carbocyclic radical in which the X$^1$H and

moieties occupy ortho positions;
R$^4$ is hydrogen, a lower alkyl radical or a lower aryl radical which optionally contains hydroxy or COOR$^5$ substituents; and
R$^5$ is hydrogen, lower alkyl or lower aryl.

2. A process according to claim 1 wherein the polycarbonate comprises repeating units of the formula

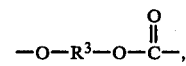

wherein R$^3$ is a divalent aromatic radical derived from a dihydroxyaromatic compound of the formula HO—R$^3$—OH.

3. A process according to claim 2 wherein the poly(alkylene dicarboxylate) comprises units of the formula

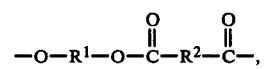

wherein R$^1$ is a saturated divalent aliphatic hydrocarbon radical containing about 2–10 carbon atoms and R$^2$ is a divalent aliphatic radical containing about 2–20 carbon atoms or a divalent aromatic radical containing about 6–20 carbon atoms.

4. A process according to claim 3 wherein the weight ratio of poly(alkylene dicarboxylate) to polycarbonate is from about 99:1 to about 1:99.

5. A process according to claim 4 wherein R$^1$ is the ethylene, trimethylene or tetramethylene radical.

6. A process according to claim 5 wherein R$^2$ is an aromatic radical.

7. A process according to claim 6 wherein the dihydroxyaromatic compound from which R$^3$ is derived is bisphenol A.

8. A process according to claim 7 wherein the poly(alkylene dicarboxylate) is a terephthalate.

9. A process according to claim 4 wherein X$^1$ is O.

10. A process according to claim 9 wherein X$^2$ is OR$^5$ and R$^5$ is lower alkyl.

11. A process according to claim 10 wherein Z is a single-ring aromatic carboxylic radical and $R^4$ is hydrogen.

12. A process according to claim 11 wherein $X^2$ is methoxy.

13. A process according to claim 12 wherein $R^1$ is the ethylene, trimethylene or tetramethylene radical.

14. A process according to claim 13 wherein $R^2$ is an aromatic radical.

15. A process according to claim 14 wherein the dihydroxyaromatic compound from which $R^3$ is derived is bisphenol A.

16. A process according to claim 15 wherein the poly(alkylene dicarboxylate) is a terephthalate.

17. A process according to claim 4 wherein the acid derivative is methyl salicylate, ethyl salicylate, phenyl salicylate, salicylamide, glycine, malic acid, mandelic acid or dibutyl tartrate.

18. A process according to claim 17 wherein $R^1$ is the ethylene, trimethylene or tetramethylene radical.

19. A process according to claim 18 wherein $R^2$ is an aromatic radical.

20. A process according to claim 19 wherein the dihydroxyaromatic compound from which $R^3$ is derived is bisphenol A.

21. A process according to claim 20 wherein the poly(alkylene dicarboxylate) is a terephthalate.

22. A stabilized composition prepared by the process of any one of claims 1, 9–11, 15, 16 and 18–21.

* * * * *